Nov. 29, 1938.  V. JENSEN  2,138,493
TRACTION DEVICE
Filed April 6, 1936
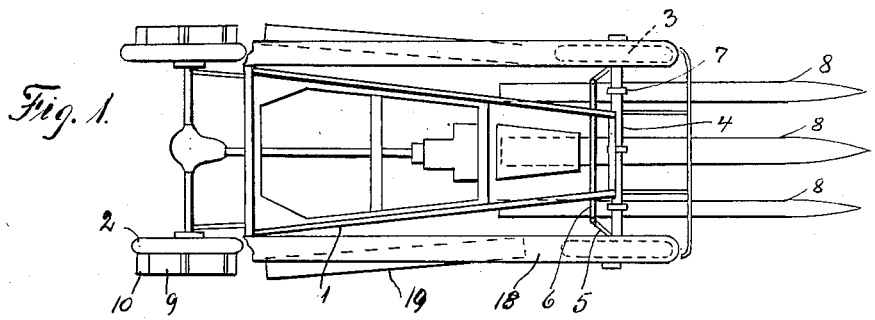
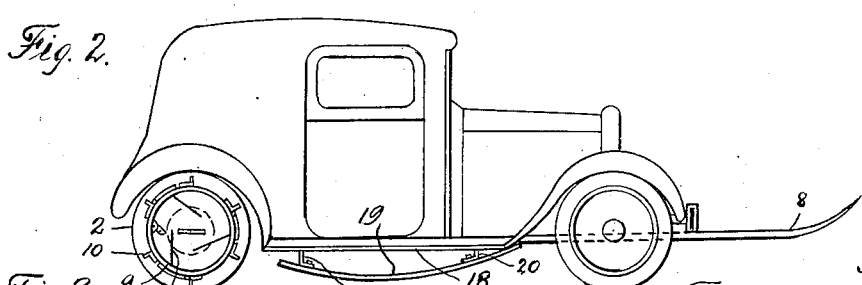
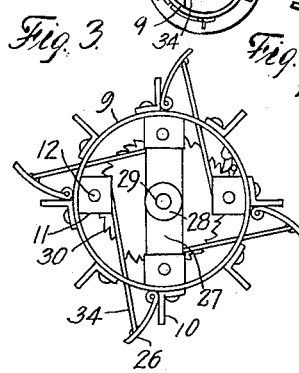 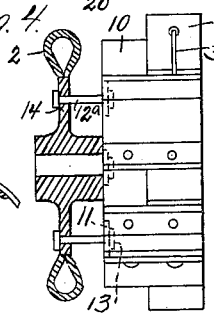 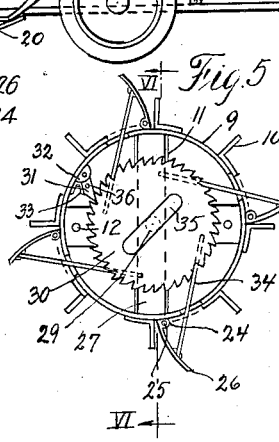 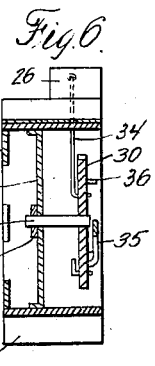

Patented Nov. 29, 1938

2,138,493

UNITED STATES PATENT OFFICE 2,138,493

TRACTION DEVICE

Viggo Jensen, Solrod, Denmark

Application April 6, 1936, Serial No. 72,859
In Denmark March 4, 1936

2 Claims. (Cl. 301—47)

The difficulties experienced when driving motor vehicles along roads covered with snow consist partly in obtaining sufficient friction between the driving wheels, which usually are the rear wheels, and the underlay, especially snow that is stamped fast, and partly in preventing the vehicle in sinking too deep in the snow, particularly when the road is covered with loose snow or in snow drifts.

The present invention relates to improvements in motor vehicles with the view of providing means to allow driving along roads covered by loose snow or where there are snow drifts, and a motor vehicle provided with these means will be able to force its way through even large drifts without much difficulty. The motor vehicle according to the invention is mainly characterized by the driving wheels each being provided with frictional members extending from the side thereof, such members comprising, for instance, wings or vanes that are disposed in such a manner in relation to the wheels that they only begin to act when the wheels are sunk a certain depth in the snow. Furthermore, the vehicle is provided with snow rails placed beneath the front end of the vehicle and disposed so much above the contact surface of the wheels that they only contact with the snow when the front wheels are sunk a certain distance in the snow.

The devices mentioned may be arranged detachably to the vehicle to allow their removal when not wanted, and it will be understood that a vehicle fitted with the devices according to the invention may be employed for driving along a road irrespective of there being snow or not.

The invention is illustrated in the accompanying drawing, where

Fig. 1 is the chassis of a motor vehicle seen from above and provided with the appliances according to the invention, Fig. 2 a diagrammatic side elevation of a motor vehicle according to the invention, Figure 3 shows one manner of constructing the frictional member seen from the left side of Figure 4.

Figure 4 is a side elevation of the same attached to a rear wheel, shown in section.

Figure 5 is an end view of the frictional member seen from the right side of Figure 4; and Figure 6 is a vertical section through line 6—6 in Figure 5.

In the manner of construction illustrated in Figs. 1 and 2 the chassis is indicated by 1, the rear wheels which are here understood as the driving wheels by 2, the front or steering wheels by 3 and the front axle by 4.

By means of straps or clamps 7 three snow rails 8 are attached to the lower side of the front axle 4. To ensure their rigidity they may furthermore be fastened to the fender as shown. As shown in Fig. 2 the snow rails are raised so much from the contact surface of the wheels that they do not hinder driving on a clear road, and do not contact with the snow before the wheels are sunk somewhat in the snow.

To the rear wheels, the driving wheels, there is attached a comparatively broad ring 9 that along its outer surface has a number of transversely disposed fixed lug members 10 consisting of, for instance, angular plates. As will be seen from Figures 3 and 4 the outermost edges of the fixed lug members 10 do not extend to the outer edge or periphery of the pneumatic tires on the wheels, and accordingly the lug members do not become active before the wheels have been somewhat imbedded in the snow. By this arrangement it is possible to drive the vehicle along a road that in places is clear and in other places is covered with snow in drifts.

The ring 9 may be attached to the wheel in various known manners according to the construction of the wheel in question. For example the ring may be provided with lugs 11 attached to the inner edge of the ring, that is the edge facing the wheel when the ring is applied thereto, and extending inwardly towards the centre of the ring. The lug is provided with a hole 12 for a bolt 12a that extends through a hole in the disc 14 of the wheel and is fastened by means of a nut 13 inside the ring.

At times the snow may be so loose that the rear wheels sink so deeply into the snow that the lug members have difficulty in propelling the vehicle. To remedy this there is arranged at each side of the vehicle along and beneath the footboards 18, Figs. 1 and 2, a board 19 attached by means of angle pieces 20. These boards are of the same width or slightly wider than the rings 9 and are curved somewhat upwardly at their front ends. When driving in snow the boards will serve to compress the snow in front of the rings 9 to the effect that however loose the snow is originally it will be sufficiently compressed to provide sufficient grip for the lug members 10 for the propulsion of the vehicle.

Disposed between, for instance, every other pair of fixed lug members there is pivotally attached to the outer surface of the ring 9 a number of wings 26 of such a length that they extend further out from the ring than the rigid members. They may thus be used when the vehicle enters a snow drift of considerable depth and consisting of very loose snow. These rotatable wings may extend so far outwardly that they prevent the driving on a clear road, in which instance they are turned down to lie along the surface of the ring.

With particular reference to Figs. 5 and 6, in which the wings 26 are shown in an intermediate position there is arranged immediately behind a rigid member 10 a bearing 24 for a pivot 25 carrying a wing 26 of a length that allows the wing to find room between two rigid members 9 when laid down in its inactive position, as is indicated with dotted lines in Fig. 5. In its raised position the wing 26 may be turned to abut the adjacent rigid member 10. Within the ring there is attached to the inner sides thereof a transverse bar 27 with a centre bearing 28 for a shaft 29. This shaft has fixed to it a ratchet wheel 30 that cooperates with a pawl 31 rotatably mounted in a bearing 32 attached to the inside wall of the ring 9. The pawl is acted upon by a spring 33 to engagement with the ratchet wheel 30. The wings 26 are each connected with the ratchet wheel 30 by means of connection rods 34. By means of a handle 35 on the ratchet wheel 30 the latter may be turned in one direction, counter-clockwise in Figure 5, and the wings will be turned down to their inactive position, the ratchet wheel being locked against rotation in the opposite direction by the pawl. Upon releasing the pawl from its engagement with the ratchet wheel for which purpose the pawl may be provided with an outwardly projecting handle 36, this wheel may be turned in the opposite direction, clockwise, and the wings will be raised. This operation may be effected by hand.

What I do claim is:—

1. In a motor vehicle, the combination in a flat ring detachably arranged on the outer side of each driving wheel transversely disposed and rigidly attached lug members on the outer surface of the ring with transversely disposed wings arranged for rotation on the outer surface of the ring between the rigid lug members, pivotal bearings for the said wings rigidly attached to the outer surface of the ring, means for turning the wings by hand in the bearings, and means for locking the wings when turned down in their inactive position along the outer surface of the ring.

2. In a motor vehicle, the combination in a flat ring detachably arranged on the outer side of each driving wheel, of transversely disposed lug members rigidly attached to the outer surface of the ring, with transversely disposed wings, for rotation on the outer surface of the ring, pivotal bearings for the said wings attached rigidly to the outer surface of the ring close to the rigid lug members, connection rods attached by their one end to each of the wings, a transverse bar attached within the ring, a bearing in the centre hereof, a shaft journalled in the bearing, a ratchet wheel fixed to the shaft, the free ends of the said connection rods attached to the ratchet wheel close to the periphery thereof, a pawl, a bearing for the pawl attached to the inner surface of the ring, a spring holding the pawl in engagement with the teeth of the ratchet wheel, and means attached to the pawl and the ratchet wheel to allow their displacement by hand.

VIGGO JENSEN.